United States Patent Office 3,652,582
Patented Mar. 28, 1972

3,652,582
ADDUCT OF 5,5-DIMETHYLHYDANTOIN WITH CHLORAL HYDRATE AND ITS PREPARATION
Janos Csaszar, Laszlo Nizsalovszky, and Laszlo Tardos, Budapest, Hungary, assignors to Chinoin Gyogyser-Es Vegyeszeti Termekek Gyara RT, Budapest, Hungary
No Drawing. Filed Feb. 18, 1969, Ser. No. 800,287
Claims priority, application Hungary, Feb. 21, 1968, CI 782
Int. Cl. C07d 49/32
U.S. Cl. 260—309.5
2 Claims

ABSTRACT OF THE DISCLOSURE

An addition compound is formed by reaction of dimethylhydantoin with chloral hydrate at room temperature. The product is a hypnotic free of the side effects of chloral hydrate.

---

This invention relates to new chemical compounds, more particularly to new chloral derivatives for pharmaceutical use and to processes for preparing the same.

It is known, that chloralhydrate has hypnotic properties. However its pharmaceutical use for this purpose was stopped before long because of the disagreeable smell and taste as well as because of the side-effects attacking especially the stomach. The molecule compound of chloralhydrate formed with phenazone, betaine (U.S. Pat. 3,028,420), acetylglycinamide (DAS 1,242,624) were proposed as hypnotics recently.

It has been found according to the present invention, that the new molecule compound containing 5,5-dimethylhydantoin and chloralhydrate is a valuable pharmaceutical which can be used as active ingredient in hypnotics.

It has been found that the new compound can be prepared by reacting 5,5-dimethylhydantoin with chloralhydrate.

The new compound is a hypnotic, the indication-field of which is broader than that of the chloral hypnotics described up to now. It can be administered for a long time perorally without danger.

When preparing the new compound according to the invention it is preferable to react 1 mole 5,5-dimethylhydantoin with 2–2.5 moles of chloralhydrate.

The reaction is carried out preferably in an aqueous suspension of dimethylhydantoin at room-temperature. The product is isolated from the reaction-mixture after cooling and crystallisation in pure state. The new compound has a melting point a 75–58° C. M=293.5. Solubility in water: 1 g./5 ml. (18° C.).

The new molecule compound can be finished for immediate medical use by known methods of pharmaceutical industry and after addition of suitable ingredients in the form of tablets, pills, coated pills, capsules, solutions, powder-mixtures, suspensions, or sterile injection-solutions. The normal dose for the treatment of adults is 500 mg./p.d. Doses of 250 mg./p.d. can be used as tranquillants.

The most important pharmacological data of the new 5,5-dimethylhydantoin chloralhydrate are the following:
Acute toxicity: $LD_{50}$=I.V. 1060 mg./kg., p.o. 2100 mg./kg. Chronical toxicity: No difference was observed for 3 months between control rats and those obtaining 300 mg./kg. daily doses. Neither inhibition of blood formation nor liver damage were observed.

Effective doses of hypnotic effect are the following:

| $ED_{50}$(mg./kg.) | Way of administration | Animals |
|---|---|---|
| 555 | Peroral | Mice. |
| 480 | Peroral | Rats. |
| 520 | I.m. | Mice. |
| 570 | I.m. | Rats. |

The therapeutical index of the compound on mice: $ED_{50}/LD_{50}$=0.2.

EXAMPLE 1

320 g. 5,5-dimethylhydantoin are suspended in 1 l. of water whereupon 950 g. of freshly distilled chlorale in a cold solution of 625 ml. water is added dropwise. After stirring the reaction-mixture at 20–25° C. for 1 hour it is cooled to 0–(−3)° C. and stirred for 3 hours at this temperature. The crystals are filtered, washed with 50 ml. of benzene, and dried below 20° C. or in vacuo until 6.5–8.5% water-content. 550 g. of 5,5-dimethylhydantoin chloralhydrate are obtained.

Yield: 75%. Purity: 92.0–98.0 (acidim). Melting point 73–78° C.

EXAMPLE 2

500 mg. quantities of 5,5-dimethylhydantoin-chloralhydrate are filled into small capsules, made of gelatine.

EXAMPLE 3

Tablets or pills are formulated, containing the following ingredients:

| | Mg. |
|---|---|
| 5,5-dimethylhydantoin chloralhydrate | 500 |
| Silica (finely divided) | 30 |
| Maize starch | 600 |
| Magnesium stearate | 66 |

What we claim is:
1. The adduct of the reactants 5,5-dimethylhydantoin and chloral hydrate having a melting point of about 75–78° C., a solubility in water at 18° C. of about 1 g./5 ml. and a molecular weight of 293.5, said molecular weight showing that said adduct is a compound of 1 mole of each of said reactants.
2. A process, comprising the steps of suspending 5,5-dimethylhydantoin in approximately three times its weight of water, adding dropwise about three times its weight of freshly distilled chloral hydrate in about twice its weight of water, all at room temperature, stirring at about 20–25° C. for one hour, cooling to about −3 to 0° C., stirring at this temperature for about three hours, filtering off the resultant crystals, washing said crystals with about ⅛ its weight of benzene, and drying below about 20° C. to a water content between about 6.5% and 8.5%.

References Cited
UNITED STATES PATENTS
3,028,420   4/1962   Petrow et al. _____ 260—501.13
FOREIGN PATENTS
1,242,624   6/1967   Germany _____ 260—501.13

HENRY R. JILES, Primary Examiner
R. T. BOND, Assistant Examiner

U.S. Cl. X.R.
424—273